(12) United States Patent
Södergård

(10) Patent No.: US 8,844,977 B2
(45) Date of Patent: Sep. 30, 2014

(54) SUCTION CONNECTION FOR CONNECTING A SUCTION PIPE TO A DRY INSTALLED CENTRIFUGAL PUMP

(75) Inventor: Bengt Södergård, Upplands Väsby (SE)

(73) Assignee: Xylem IP Holdings LLC., White Plains, NY (US)

( * ) Notice: Subject to any disclaimer, the term of this patent is extended or adjusted under 35 U.S.C. 154(b) by 0 days.

(21) Appl. No.: 13/703,186

(22) PCT Filed: Jun. 8, 2011

(86) PCT No.: PCT/SE2011/050700
§ 371 (c)(1),
(2), (4) Date: Dec. 10, 2012

(87) PCT Pub. No.: WO2011/155894
PCT Pub. Date: Dec. 15, 2011

(65) Prior Publication Data
US 2013/0082464 A1    Apr. 4, 2013

(30) Foreign Application Priority Data
Jun. 9, 2010 (SE) ....................... 1050590

(51) Int. Cl.
*F16L 15/02*    (2006.01)
*F16L 23/00*    (2006.01)
*F04D 29/60*    (2006.01)

(52) U.S. Cl.
CPC .............. *F16L 23/00* (2013.01); *F04D 29/607* (2013.01)
USPC .......................................... 285/302; 285/412

(58) Field of Classification Search
USPC ................ 285/412, 414, 31, 223, 225, 302
See application file for complete search history.

(56) References Cited

U.S. PATENT DOCUMENTS

| 753,817 | A | * | 3/1904 | Andrews ..................... 285/225 |
| 1,502,678 | A | | 7/1924 | Merseles |
| 3,131,642 | A | * | 5/1964 | Geer et al. .................. 285/302 |
| 6,599,086 | B2 | | 7/2003 | Soja |

(Continued)

FOREIGN PATENT DOCUMENTS

| FR | 2315022 A1 | 1/1977 |
| JP | 51157002 | 12/1976 |
| JP | 0667896 | 9/1994 |
| JP | 0683986 | 12/1997 |

OTHER PUBLICATIONS

English translation of Office Action issued Jan. 8, 2014, in corresponding Japanese Patent Application No. 2013-514137.

*Primary Examiner* — Aaron Dunwoody
(74) *Attorney, Agent, or Firm* — Browdy and Neimark, PLLC

(57) ABSTRACT

A suction connection, including a first flange that includes a centrally located through hole and is arranged to be connected to an outlet of a suction pipe and a second flange that includes a centrally located through hole and that is arranged to be connected to an inlet of a dry installed centrifugal pump. The suction connection includes a first pipe socket, which is displacable in the axial direction between an operative position in which said first pipe socket disengageably connects the first flange and the second flange and thereby puts the through hole of the first flange in fluid communication with the through hole of the second flange, and a service position in which the first pipe socket is located at a distance from the second flange and thereby admit access to the through hole of the second flange.

10 Claims, 9 Drawing Sheets

(56) References Cited

U.S. PATENT DOCUMENTS 6,659,511 B2 * 12/2003 Yoneyama et al. .......... 285/360
2007/0036643 A1 2/2007 Arnold
2010/0239419 A1 9/2010 Maier et al.

* cited by examiner

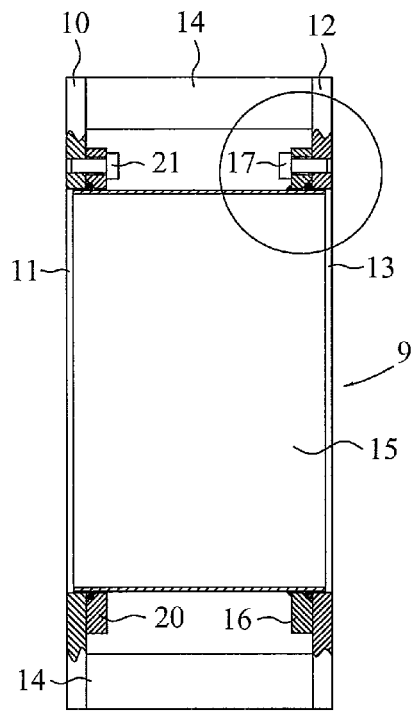
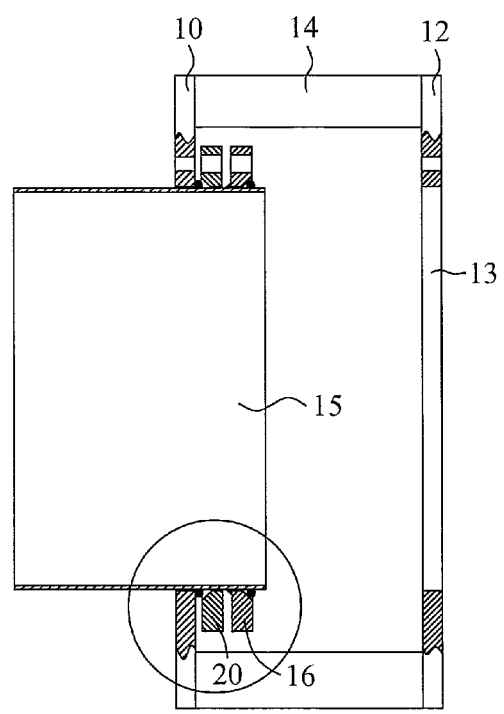
Fig. 4
Fig. 5
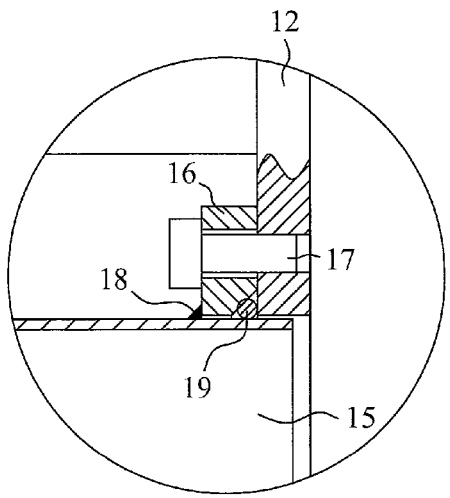
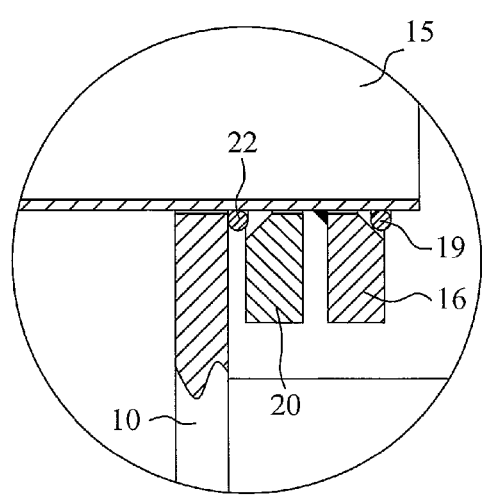
Fig. 6
Fig. 7

SUCTION CONNECTION FOR CONNECTING A SUCTION PIPE TO A DRY INSTALLED CENTRIFUGAL PUMP

TECHNICAL FIELD OF THE INVENTION

The present invention relates in general to a pump application for pumping for instance waste water or sewage water that may contain solid matter, wherein the pump application comprises a dry installed centrifugal pump and a suction pipe extending from a liquid holding tank to the centrifugal pump. In particular the present invention relates to a suction connection for connecting a suction pipe to a dry installed centrifugal pump, which suction connection comprises a first flange that includes a centrally located through hole and that is arranged to be connected to an outlet flange of a suction connection and a second flange that includes a centrally located through hole and that is arranged to be connected to an inlet flange of a centrifugal pump.

BACKGROUND OF THE INVENTION AND PRIOR ART

Pump applications using dry installed centrifugal pumps intend pump applications in which the liquid pumping centrifugal pump is not lowered into the liquid that the centrifugal pump is arranged to pump. Instead the centrifugal pump is arranged on the outside of the liquid holding tank, usually at the level of the bottom of the liquid holding tank. Furthermore, such a pump application require a suction pipe extending from the liquid holding tank to the inlet opening of the centrifugal pump.

In pump applications where the centrifugal pump is lowered into the liquid that shall be pumped there is usually not a problem to clean the inlet opening of the pump. The pump is hoisted and either the inlet opening is cleaned automatically upon hoisting due to gravity or the inlet opening is cleaned manually when the pump is lifted out of the liquid holding tank by flushing it with water or manually removing waste matter. In centrifugal pumps having a so called open impeller, when the pump is lifted out of the liquid holding tank, it is also easy to set and adjust the gap provided between the lower edge of the vane of the impeller and the impeller seat of the pump. Inspection and adjustment of this gap must be performed at recurrent interval due to the wear of the vane of the impeller and thereby the gap increase leading to deteriorating pump performance.

In pump applications where the centrifugal pump instead is dry installed, the inlet flange of the pump is bolted to a suction connection and in some applications the pump is supported by the suction connection and thereto a pressure pipe is bolted to the outlet flange of the pump. In other words, the hydraulic unit of the pump is very cumbersome to detach and in practice it is more or less fixedly arranged. Thereto the suction connection is bolted to a suction pipe that in its other end is connected to the liquid holding tank. The suction pipe is in almost all applications a conduit that sometimes comprises a maneuverable shut off valve that in its closed position prevents the liquid in the liquid holding tank to flow out when the pump is removed.

In order to clean the inlet opening of the pump and the impeller, the drive unit of the pump together with the impeller that is suspended by the drive shaft, have to be removed from the hydraulic unit of the pump. This is done by having straps and the like attached to the drive unit and thereafter a great number of bolts joining the drive unit and the hydraulic unit of the pump are loosened. Thereafter the drive unit is moved horizontally away from the hydraulic unit in order to expose the impeller. Upon adjustment of the abovementioned gap between the lower edge of the vane of the impeller and the impeller seat of the pump, so called trimming of the impeller, the impeller is displaced in the axial direction of the drive shaft of the drive unit in the direction away from the drive unit. This displacement is made with interest such that upon fitting in and reassemble of the drive unit the vane of the impeller abuts the impeller seat. Thereafter the maintenance staff measure the obtained distance between the real abutment surfaces of the drive unit and the hydraulic unit, whereupon the drive unit once more is lifted away from the hydraulic unit and the impeller is displaced in the axial direction along the drive shaft in the direction towards the drive unit the measured distance plus the predetermined height of the gap. Finally fitting in and reassembly of the drive unit takes place and then the maintenance staff may only inspect that the impeller runs freely and that the real abutment surfaces abut each other, and in other respects the maintenance staff has to rely on that the measuring and the trimming have been made in a satisfactory way. It shall be pointed out that a difference of the height of the gap by tenths of millimeters will affect the performance of the pump.

Today some suction connections comprises a small inspection hole, through which one with difficulty may introduce a mirror and see if the impeller and/or the inlet opening is clogged, in order to ensure that the drive unit is not unnecessarily detached and removed from the hydraulic unit. However, this inspection hole may neither be used to clean the impeller and/or the inlet opening, nor to trim and/or check the position of the impeller.

OBJECT OF THE INVENTION

The present invention aims at obviating the aforementioned disadvantages and failings of previously known suction connections, and at providing an improved suction connection. A primary object of the present invention is to provide an improved suction connection of the initially defined type which renders it possible to clean the inlet opening of the centrifugal pump and/or the impeller without having to remove the drive unit from the hydraulic unit.

It is another object of the present invention to provide a suction connection, which admit trimming of the impeller without having the drive unit to be removed from the hydraulic unit.

SUMMARY OF THE INVENTION

According to the invention at least the primary object is attained by means of the initially defined suction connection, which is characterized in that it comprises a first pipe socket which is displacable in the axial direction, seen in the flow direction, between an operative position in which said first pipe socket disengageably connects the first flange and the second flange and thereby puts the through hole of the first flange in fluid communication with the through hole of the second flange, and a service position in which said first pipe socket is located at a distance from the second flange and thereby admit access to the through hole of the second flange.

Thus, the present invention is based on the insight that if the access to the inlet opening of a dry installed centrifugal pump may imitate the access to the inlet opening of a hoisted submersible centrifugal pump, the inspection and maintenance will be performed in a rapid and more satisfactory way.

Preferred embodiments of the present invention are further defined by the dependent claims.

Preferably the first pipe socket at the area of the downstream located end thereof comprises a radially projecting end flange, which is disengageably connectable to the second flange. According to a preferred embodiment the first pipe socket comprises a radially projecting sealing flange movable along said first pipe socket, which sealing flange is disengageably connected to the first flange. This entail that the first pipe socket in a simple way may be put in tight connection with the first flange and the second flange, respectively, at the same time as the first pipe socket in simple operation is admitted to be displaced to the service position.

Preferably the first pipe socket extends through and is displacable in relation to the through hole of the first flange. Thereby the first pipe socket may be displaced into the suction pipe.

In yet another preferred embodiment the suction connection comprises as well a second pipe socket, which is connected to the first flange and projects in the axial direction in the direction away from the second flange, and through which the first flange is arranged to be connected to the outlet flange of the suction pipe. Preferably the first pipe socket is telescopically displacable in said second pipe socket. This entail that the inner diameter/size of the suction pipe does not need to be known, thereto the maneuverable shut off valve may be located in direct connection with the inventive suction connection without preventing displacement of the first pipe socket.

In an alternative preferred embodiment the suction connection comprises a second pipe socket, which is connected to the first flange and projects in the axial direction in the direction towards the second flange. Furthermore, the first pipe socket may be telescopically displacable in said second pipe socket and comprise a sealing flange displacable along the first pipe socket, which sealing flange is disengageably connectable to the first flange through the second pipe socket. Alternatively, the first pipe socket is telescopically displacable outwardly of said second pipe socket and comprises a sealing flange displacable along the second pipe socket, which sealing flange is disengageably connectable to the upstream located end of the first pipe socket.

Further advantages and features of the present invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein:

FIG. 4 is a partly cut away side view of a first embodiment of the inventive suction connection, having the first pipe socket in the operative position, FIG. 5 is a partly cut away side view corresponding to FIG. 4, having the first pipe socket in the service position, FIG. 6 is an enlarged view of a part of FIG. 4, FIG. 7 is an enlarged view of a part of FIG. 5.

DETAILED DESCRIPTION OF PREFERRED EMBODIMENTS

Figure 1:
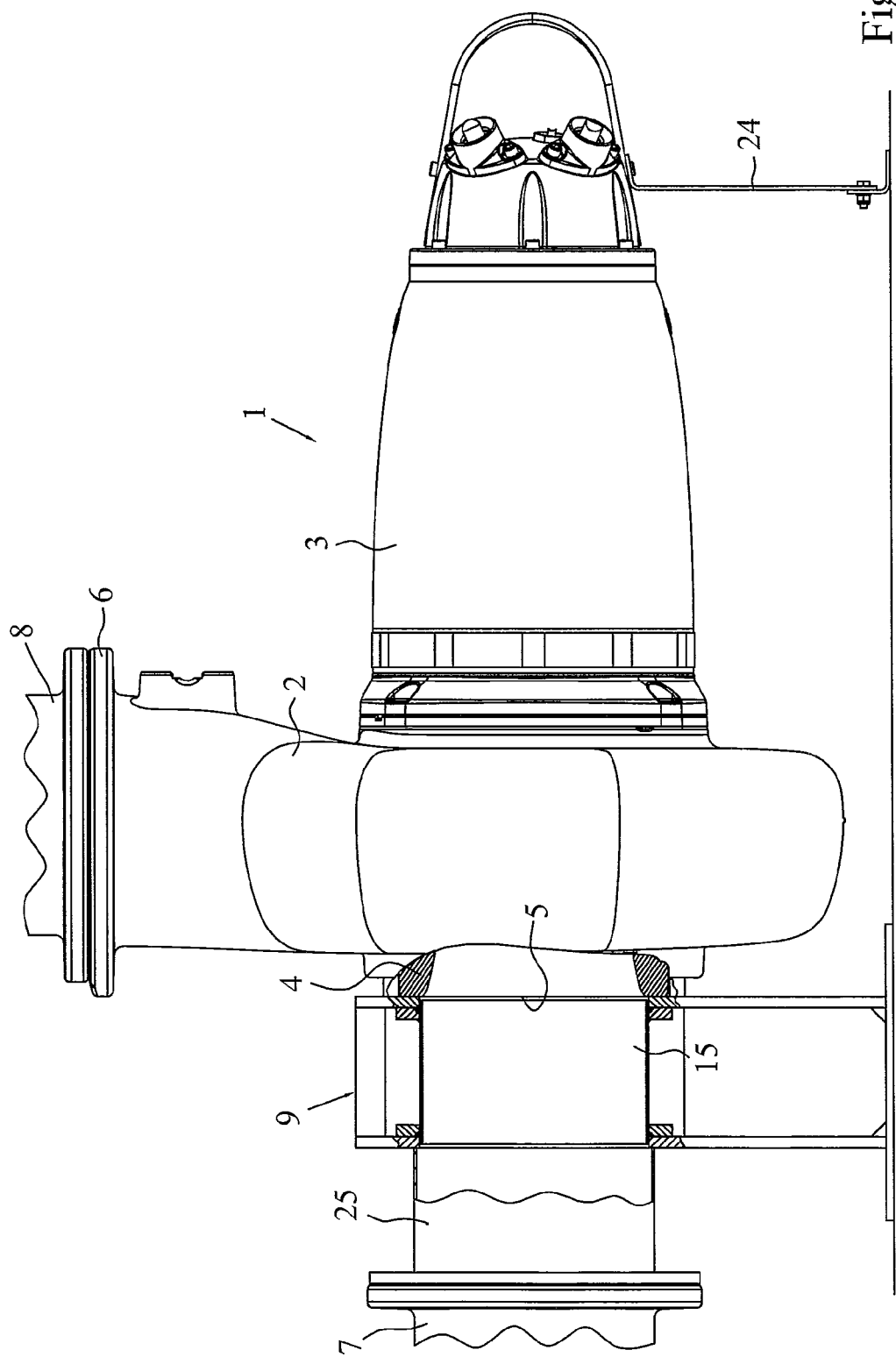
FIG. 1 is a partly cut away side view of the inventive suction connection arranged between a suction pipe and a centrifugal pump in lying configuration, having the suction connection in an operative position.
Figure 2:
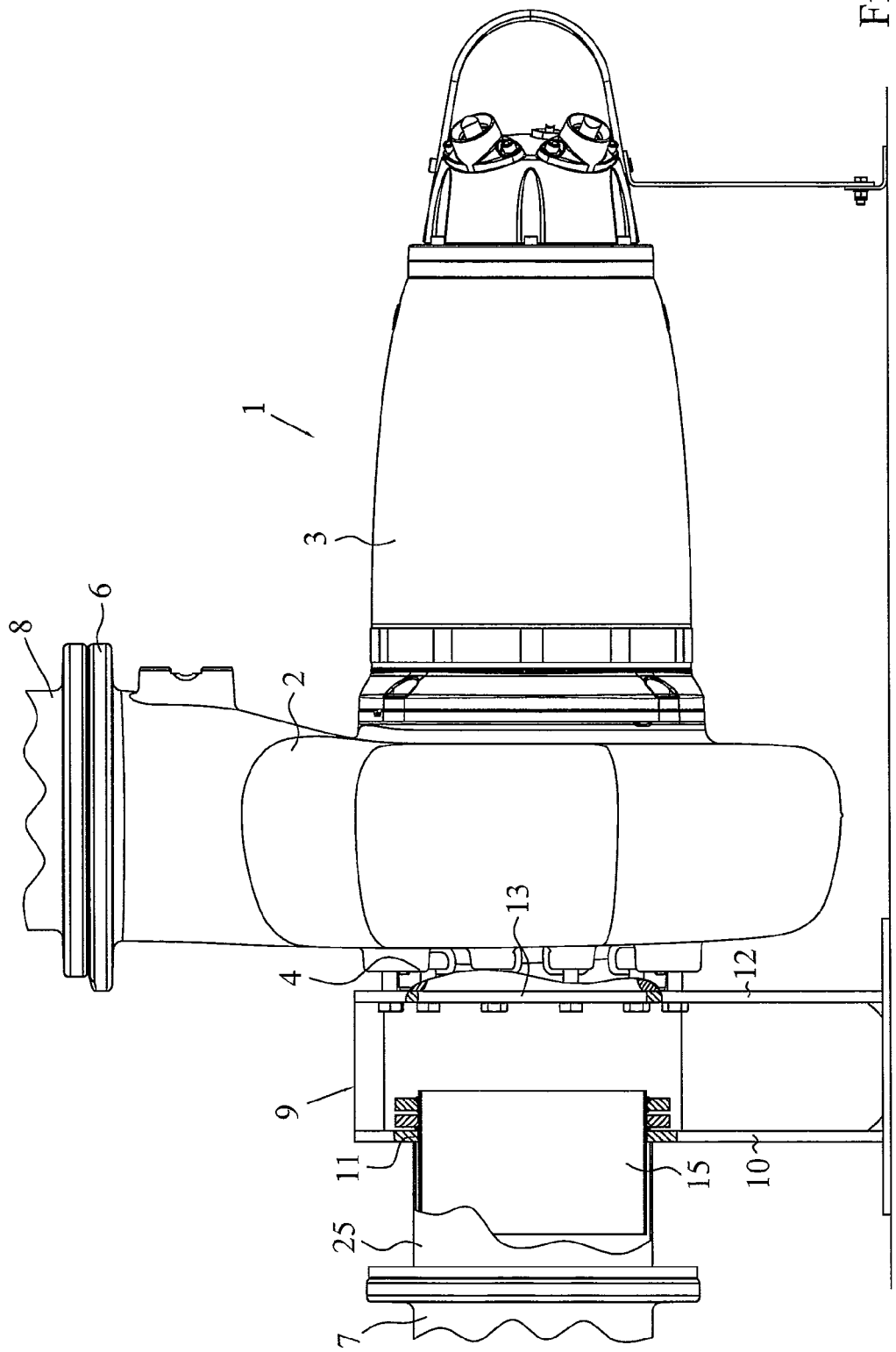
FIG. 2 is a partly cut away side view corresponding to FIG. 1, having the suction connection on a service position.
Figure 3:
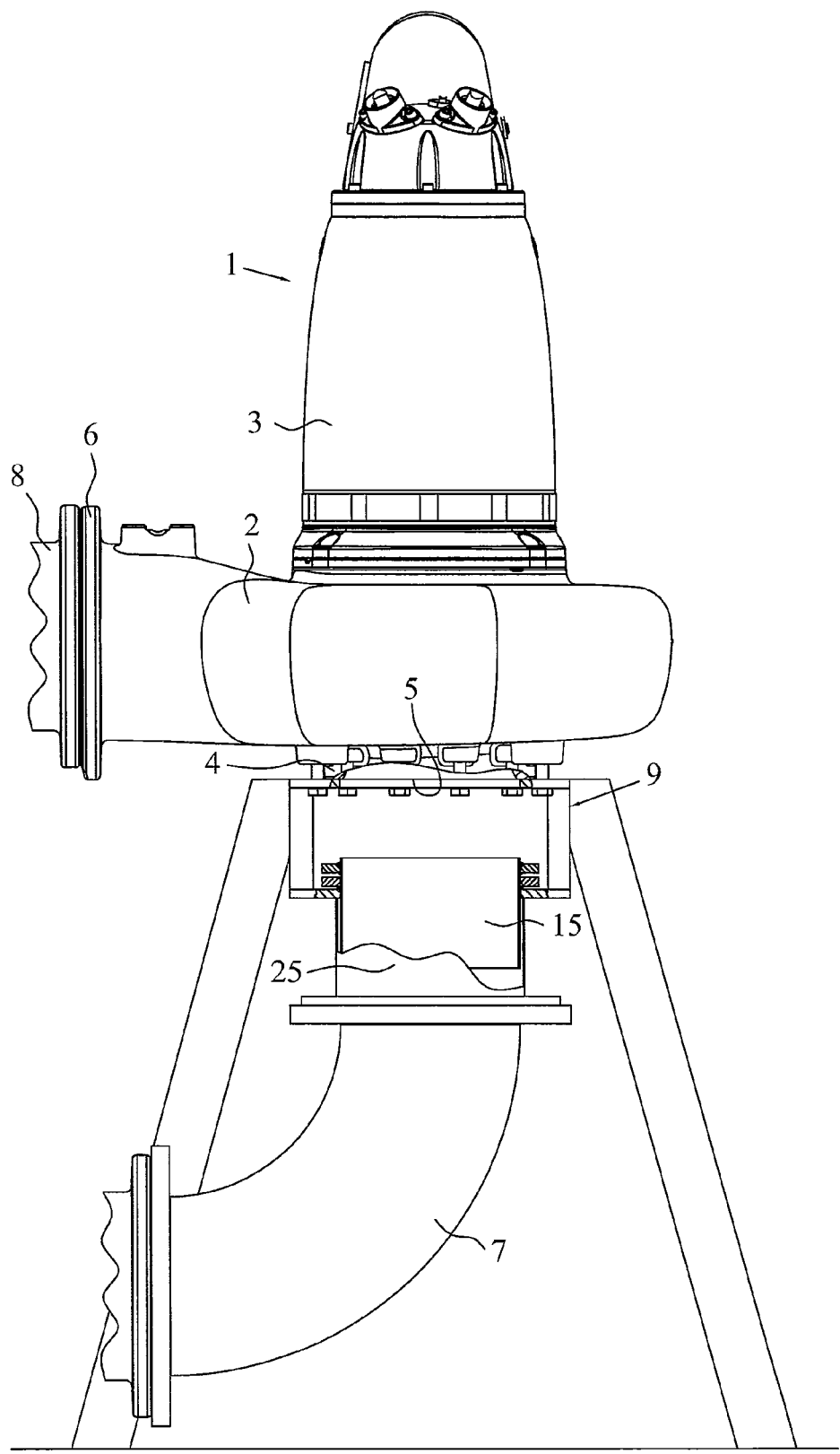
FIG. 3 is a partly cut away side view of the inventive suction connection arranged between a suction pipe and a centrifugal pump in up right configuration, having the suction connection on a service position.

The present invention relates in general to a pump application. Referring by way of introduction to FIGS. 1-2 and FIG. 3, in which is shown a centrifugal pump/waste water pump, generally designated 1, in lying configuration and up right configuration, respectively. It shall be pointed out that the present invention is not limited to a centrifugal pump 1 oriented lying or up right, but other orientations of the centrifugal pump are included.

The centrifugal pump 1 comprises a hydraulic unit 2, which is the part wherein the actual pumping takes place and wherein the impeller (not shown) of the centrifugal pump 1 is located, and a drive unit 3, which is the part comprising a motor, other possible operation equipment (not shown) and a drive shaft from which the impeller is suspended. The hydraulic unit 2 of the centrifugal pump 1 comprises an inlet 4 having an inlet opening 5 and an outlet 6 having an outlet opening. The inlet 4 is indirectly connected to a suction pipe 7 and the outlet 6 is direct or indirect connected to a pressure pipe 8.

Furthermore an inventive suction connection, generally designated 9, is shown in FIGS. 1, 2 and 3, which suction connection is arranged to connect the outlet of the suction pipe 7 and the inlet 4 of the dry installed centrifugal pump 1.

Reference is now made to FIGS. 4 and 5, in which a first embodiment of the inventive suction connection is shown. The suction connection 9 comprises a first flange 10 including a centrally located through hole 11 and a second flange 12 including a centrally located through hole 13. Said first flange 10 is arranged to be connected to an outlet of the suction pipe 7 and said second flange 12 is arranged to be connected to the inlet 4 of the centrifugal pump 1. Preferably the first flange 10 and the second flange 12, respectively, are connected to the suction pipe 7 and the centrifugal pump 1, respectively, by means of a number of bolts in a conventional way within the technical field of connecting pipe fittings and the like, however, other attachment means may be used. Preferably the suction connection comprises one or more stiffening bars 14 extending between and fixedly connected to the first flange 10 and the second flange 12. The stiffening bars 14 are adapted to hold the suction connection 9 together and to align the through hole 11 of the first flange 10 and the through hole 13 of the second flange 12. In the shown embodiment an upper stiffening bar and a lower stiffening bar are present.

Furthermore the inventive suction connection 9 comprises a first pipe socket 15. Seen in the flow direction from the suction pipe 7 to the pressure pipe 8, the first pipe socket 15 is displacable in the axial direction between an operative position (see FIG. 4) and a service position (see FIG. 5). In the operative position the first pipe socket 15 connects the first flange 10 disengageably to the second flange 12 and thereby the first pipe socket 15 puts the through hole 11 of the first flange 10 in fluid communication with the through hole 13 of the second flange 12. Fluid communication means that the interface between the first pipe socket 15 and through hole 11 of the first flange 10 and between the first pipe socket 15 and the through hole 13 of the second flange 12, respectively, are fluid tight. In the service position the first pipe socket 15 is located at a distance from the second flange 12 and thereby admit access to the through hole 13 of the second flange 12. Due to the fact that the suction connection 9 is intended to be mounted connected to the inlet 4 of a centrifugal pump 1, access to the inlet opening of the centrifugal pump 1 and the impeller located in the hydraulic unit 2 of the centrifugal pump 1 is admitted, when the first pipe socket 15 is in the service position. When the first pipe socket 15 of the suction connection 9 is in the service position the impeller may be trimmed and cleaned in a simple way. In the shown first embodiment, the first pipe socket 15 extends through and is displacable in relation to the trough hole 11 of the first flange 10. When the first pipe socket 15 is in the service position according to FIG. 5, it projects into the suction pipe 7.

A preferred embodiment of disengageably connecting the first pipe socket 15 and the second flange 12 embrace that the first pipe socket 15 at the area of the downstream located end thereof comprises a radially projecting end flange 16. See also FIG. 6. The end flange 16 is in the shown embodiment connectable to the second flange 12 by means of a number of screws 17, which are dispersed along the circumference of the first pipe socket 15. Furthermore, the end flange 16 is in the shown embodiment fixedly connected to the outside of the first pipe socket 15 by means of a weld joint 18. When the end flange 16 is bolted to the second flange 12 a circumferential sealing ring 19 is compressed between a chamfering of the end flange 16, the second flange 12 and the first pipe socket 15, which entail a fluid tight connection of the first pipe socket 15 to the second flange 12. However, it shall be pointed out that the end flange 16 not necessarily needs to be fixedly connected to the first pipe socket 15, since the first pipe socket 15 is clamped to the circumferential sealing ring 19 when the end flange 16 is bolted to the second flange 12. In the shown embodiment the end flange 16 is located at a distance from the downstream located end of the first pipe socket 15, entailing that the downstream located end of the first pipe socket 15 projects into the through hole 13 of the second flange 12 when the first pipe socket 15 is in the operative position.

Furthermore, it is preferred that the first pipe socket 15 as well comprises a radially projecting sealing flange 20 displacable along said first pipe socket, which sealing flange is disengageably connectable to the first flange 10. See also FIG. 7. The sealing flange 20 is in the shown embodiment connectable to the first flange 10 by means of a number of screws 21, which are dispersed along the circumference of the first pipe socket 15. When the sealing flange 20 is bolted to the first flange 10 a circumferential sealing ring 22 is compressed between a chamfering of the sealing flange 20, the first flange 10 and the first pipe socket 15, which entail a fluid tight connection of the first pipe socket 15 to the first flange 10. It shall be pointed out that the sealing flange 20 as well as the circumferential sealing ring 22 shall be axially displacable along the first pipe socket 15. In an alternative, not shown, embodiment a fluid tight circumferential slide sealing is arranged at the interface between the through hole 11 of the first flange 10 and the outside of the first pipe socket 15, thereby entailing that the sealing flange 20 may be spared.

Reference is now made to FIGS. 8-13, which show a second embodiment of the present suction connection, merely differences in relation to the first embodiment will be described. The first flange 10 and the second flange 12 are connected to a ground plate 23 making the suction connection 9 self supporting, in contrast to the first embodiment of the suction connection 9 described above, which is arranged to be supported by the centrifugal pump 1 and/or the suction pipe 7. In this embodiment the suction connection 9 is arranged to, together with a eligible bar 24, support the centrifugal pump 1, as is shown in FIGS. 1 and 2. In the shown embodiment the first flange 10 and the second flange 12 are grandfather clock shaped. As a complement or alternative the centrifugal pump 1 may be supported by other not shown elements, such as integrated shoulders in the hydraulic unit 2, which shoulders are bolted to the bedding or a separate stand arranged at the inlet 4 of the centrifugal pump 1 or at another suitable location.

In the second embodiment the suction connection 9 comprises as well a second pipe socket 25, which is connected to the first flange 10 and projects in the axial direction in the direction away from the second flange 12, and via which the first flange 10 is arranged to be connected to the outlet flange of the suction pipe 7. This entail that the first pipe socket 15 is telescopically displacable in said second pipe socket 25, thereby the function of the inventive suction connection is not affected by the nature of the suction pipe 7. It shall be pointed out that the second pipe socket 25 may present diverging conical shape in the direction towards the suction pipe 7. Furthermore, the second pipe socket 25 may be constituted by an unattached element that may be connected to the first flange 10, whereupon different second pipe sockets 25 having different shape may be exchanged for each other in order to adapt the suction connection 9 to suction pipes 7 having different diameters and extension. It shall be pointed out that the presence of the second pipe socket 25 and the presence of the ground plate 23 are not dependent on each other. At the inside of the second pipe socket 25 and/or at the outside of the first pipe socket 15 there is preferably arranged centering means (not shown) in order to facilitate displacement of the first pipe socket 15 in relation to the second pipe socket 25.

Figure 8:
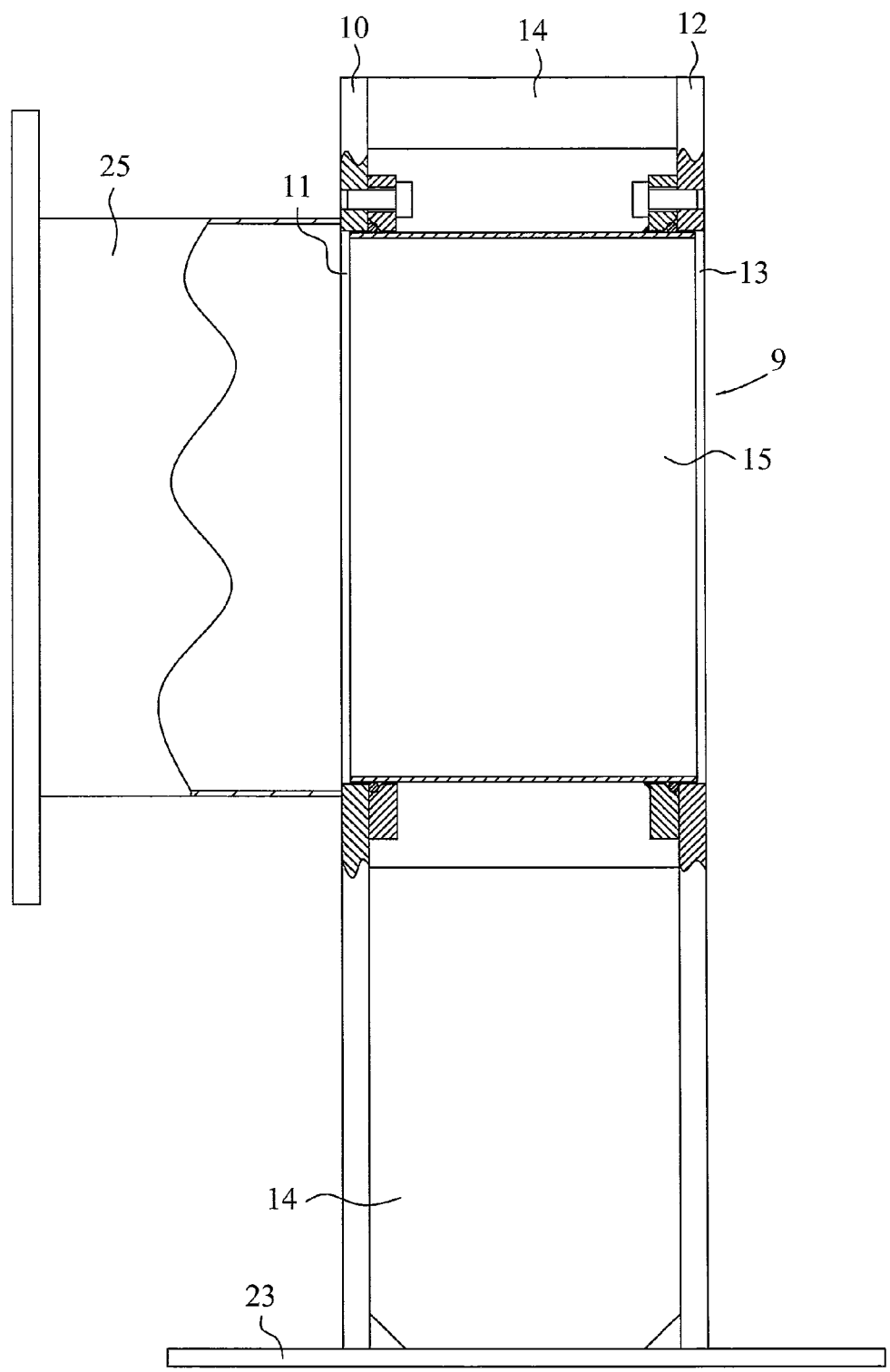
FIG. 8 is a partly cut away side view of a second embodiment of the inventive suction connection, having the first pipe socket in the operative position.
Figure 9:
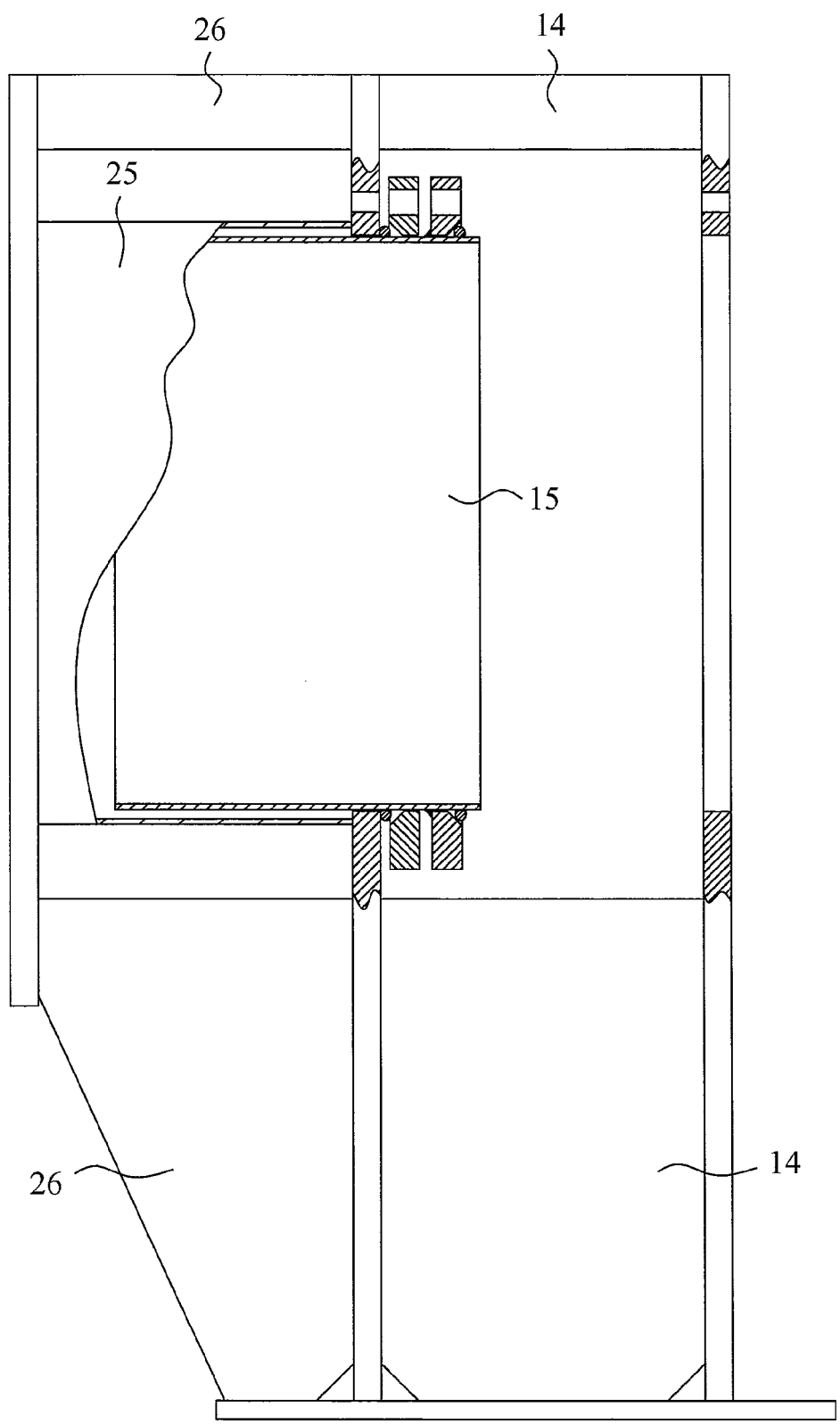
FIG. 9 is a partly cut away side view of a variant of the second embodiment of the inventive suction connection, having the first pipe socket in the service position.
Figure 10:
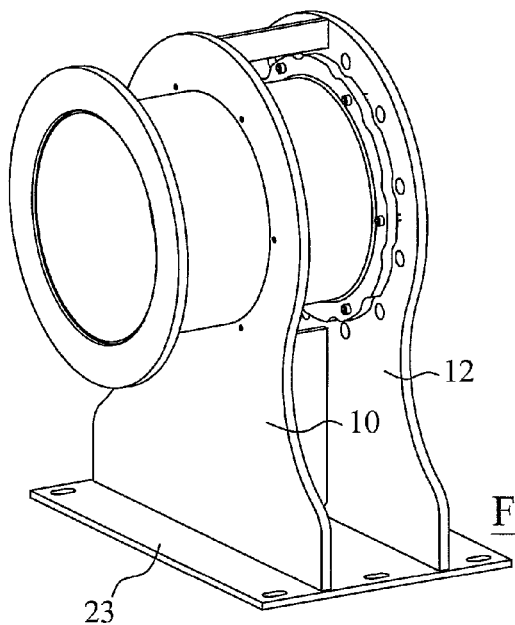
FIG. 10 is a perspective view from behind of the suction connection according to FIG. 8, having the first pipe socket in the operative position.
Figure 11:
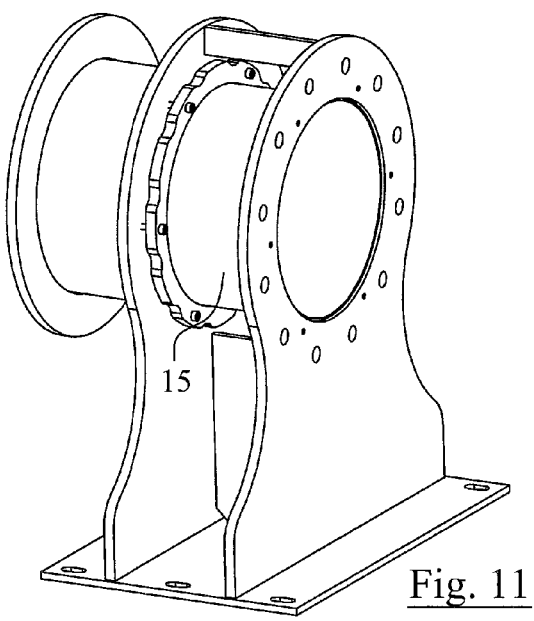
FIG. 11 is a perspective view from the front of the suction connection according to FIG. 10.
Figure 12:
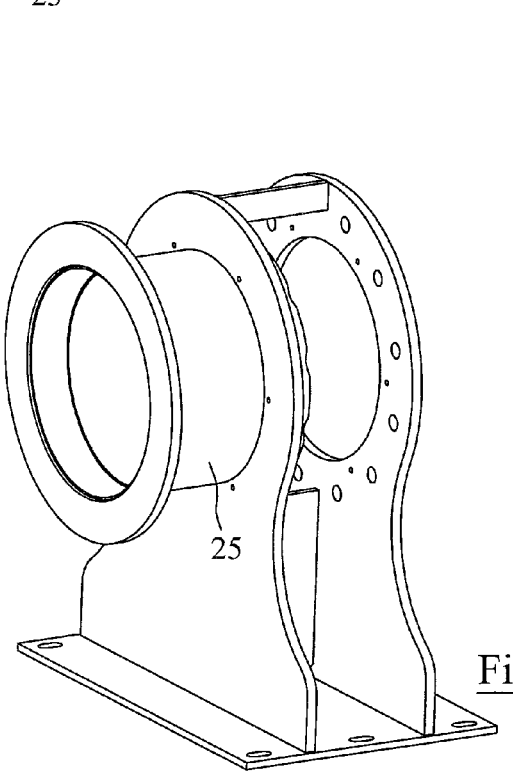
FIG. 12 is a perspective view from behind of the suction connection according to FIG. 8, having the first pipe socket in the service position.
Figure 13:
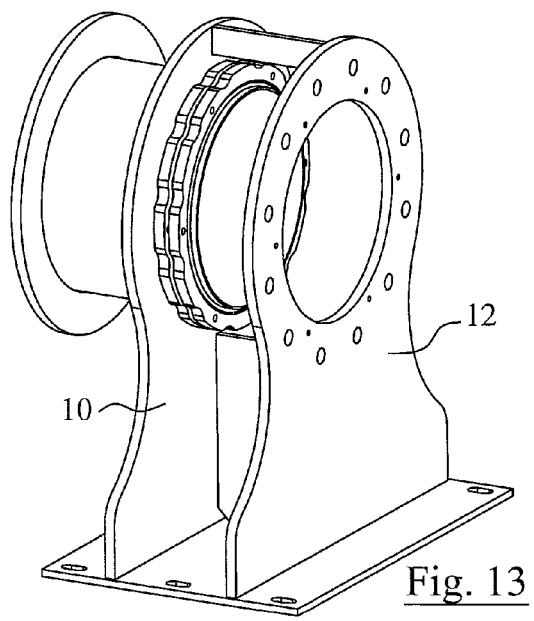
FIG. 13 is a perspective view from the front of the suction connection according to FIG. 12.

In FIG. 9 the second embodiment of the suction connection 9 comprises, in addition to what is shown in FIG. 8, additional stiffening bars 26 acting to back up the second pipe socket 25. FIGS. 10-11 and 12-13, discloses the second embodiment of the inventive suction connection 9 in the operative position and the service position, respectively.

Figure 14:
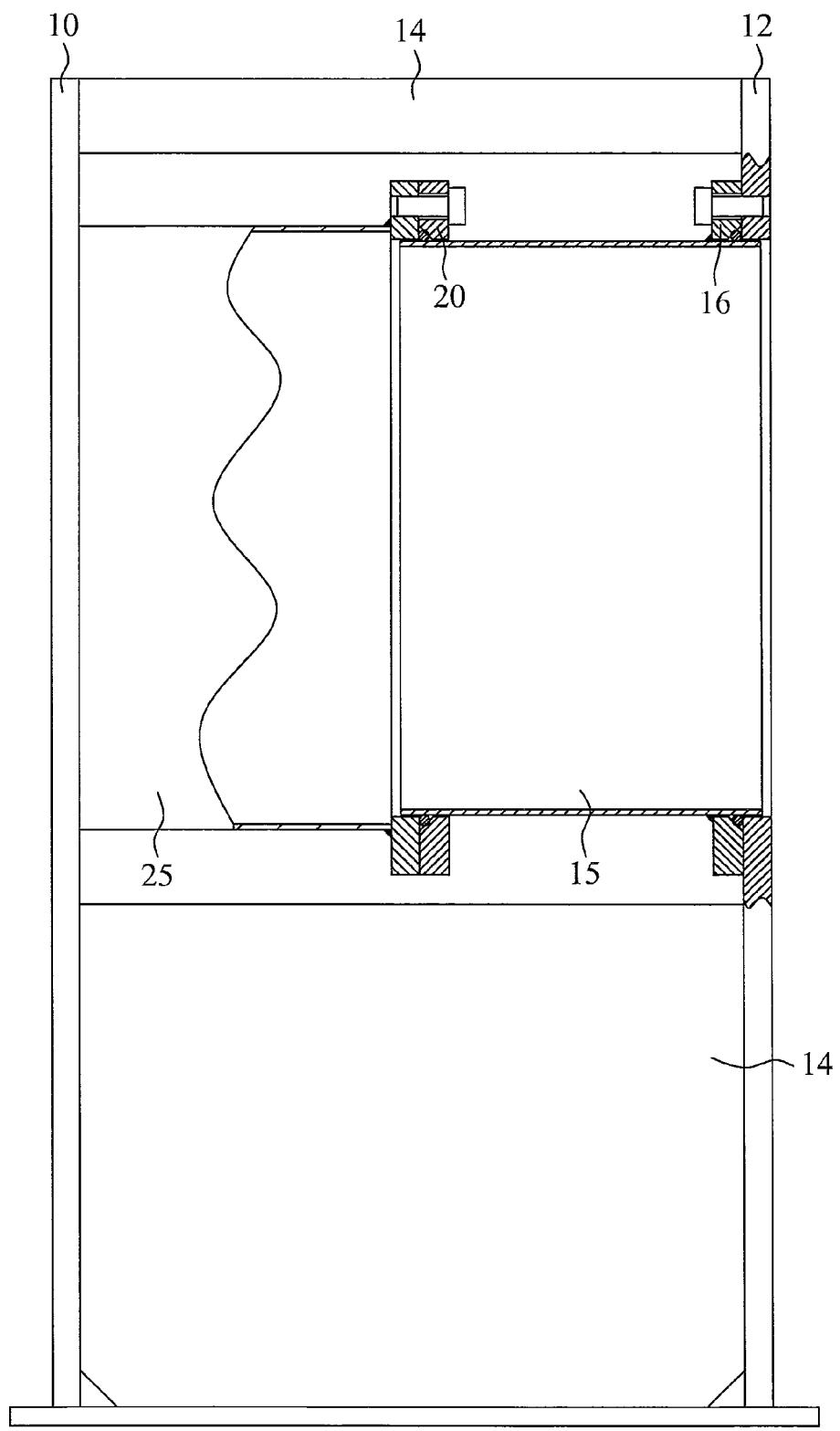
FIG. 14 is a partly cut away side view of a third embodiment of the inventive suction connection, having the first pipe socket in the operative position.
Figure 15:
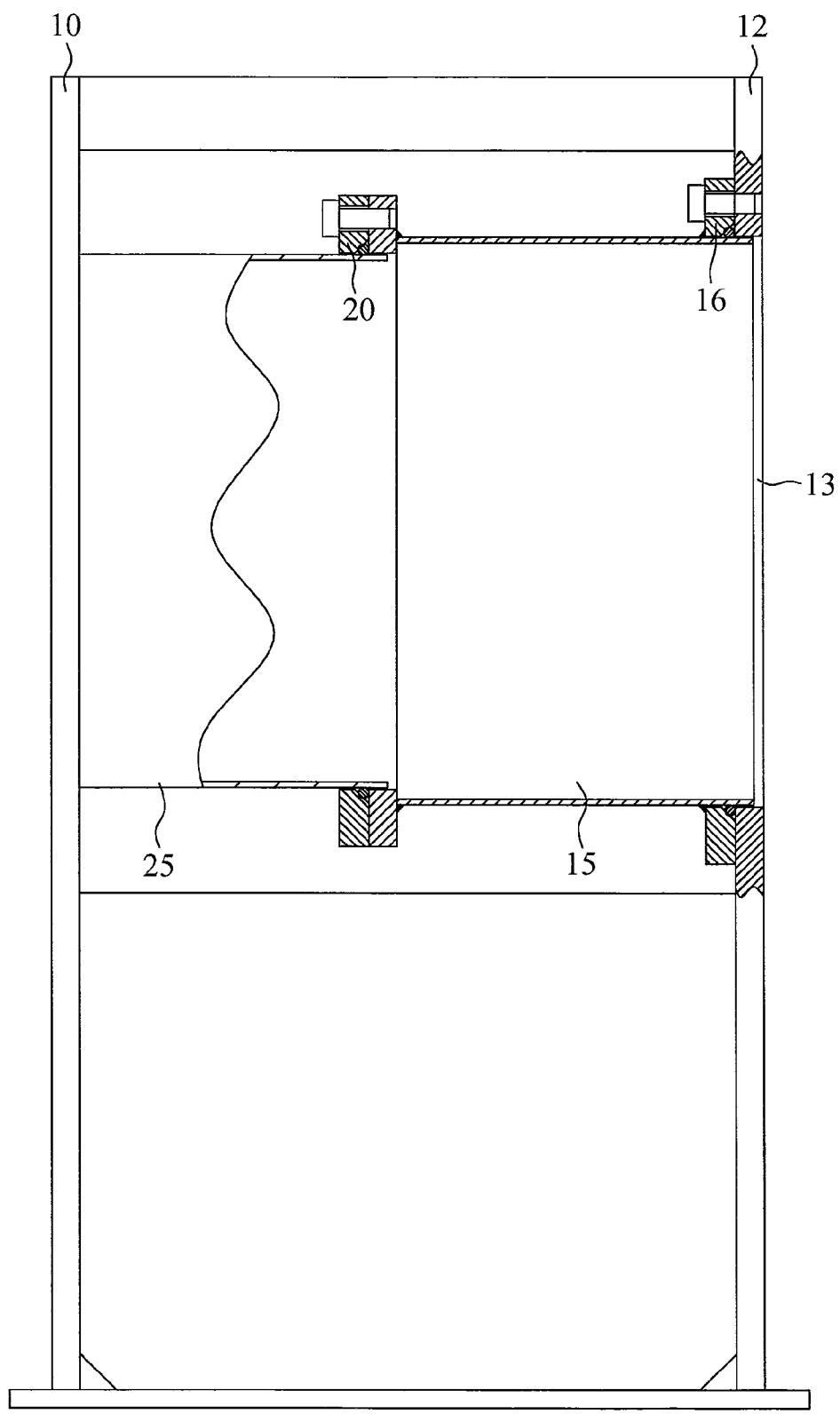
FIG. 15 is a partly cut away side view of a fourth embodiment of the inventive suction connection, having the first pipe socket in the operative position.

Reference is now made to FIGS. 14 and 15, which discloses a third and a forth embodiment, respectively, of the inventive suction connection 9, merely differences in relation to the first and second embodiments will be described. According to the third and forth embodiment the suction connection 9 comprises said second pipe socket 25, which is connected to the first flange 10 and projects in the axial direction in direction towards the second flange 12, the first pipe socket 15 being telescopically displacable in the axial direction in relation to the second pipe socket 25 between the operative position and the service position. In the operative position the first pipe socket 15 connects the first flange 10 and the second flange 12 disengageably and thereby puts the through hole 11 of the first flange 10 in fluid communication with the through hole 13 of the second flange 12. In the service position the first pipe socket 15 is arranged at a distance from the second flange 12 and thereby admit access to the through hole 13 of the second flange 12.

According to the third embodiment according to FIG. 14 the first pipe socket 15 is telescopically displacable in said second pipe socket 25. It is preferred that the first pipe socket 15 at the area of the downstream located end thereof comprises a radially projecting end flange 16, which is arranged as described above. Furthermore it is preferred that the first pipe socket 15 comprises a radially projecting sealing flange 20 displacable along said first pipe socket, which sealing flange is disengageably connectable to the first flange 10 via the second pipe socket 25, and which preferably is arranged as described above.

According to the forth embodiment in FIG. 15 the first pipe socket 15 is telescopically displacable outwardly of said second pipe socket 25. It is preferred that the first pipe socket 15 at the area of the downstream located end thereof comprises a radially projecting end flange 16, which is arranged as described above. Furthermore, it is preferred that the first pipe socket 15 comprises a radially projecting sealing flange 20 displacable along the second pipe socket 25, which sealing flange is disengageably connectable to upstream located end of the first pipe socket 15. Thus, the first pipe socket 15 is disengageably connectable to the first flange 10 via the second pipe socket 25.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/concerning terms such as upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A suction connection for connecting a suction pipe to a dry installed centrifugal pump, comprising:
    a first flange (10) that includes a centrally located through hole (11) and is removably connected to an outlet of a suction pipe, such that when the first flange is installed and in operation, the first flange is removably fixed to the outlet of the suction pipe, and
    a second flange (12) that includes a centrally located through hole (13) and is removably connected to an inlet of a centrifugal pump such that when the second flange is installed and in operation, the second flange is removably fixed to the inlet of the centrifugal pump,
    wherein the suction connection comprises a first pipe socket (15), which is displacable in an axial direction, seen in a flow direction, between an operative position in which said first pipe socket (15) disengageably connects the first flange (10) and the second flange (12) and the through hole (11) of the first flange (10) is in fluid communication with the through hole (13) of the second flange (12), and a service position in which said first pipe socket (15) is located at a distance from the second flange (12) and thereby admit access to the through hole (13) of the second flange (12).

2. The suction connection according to claim 1, wherein the first pipe socket (15) at the area of the downstream located end thereof comprises a radially projecting end flange (16), which is disengageably connectable to the second flange (12).

3. The suction connection according to claim 1, wherein the first pipe socket (15) comprises a radially projecting sealing flange (20) movable along said first pipe socket, which sealing flange (20) is disengageably connected to the first flange (10).

4. The suction connection according to claim 1, wherein said first pipe socket (15) extends through and is displacable in relation to the through hole (11) of the first flange (10).

5. The suction connection according to claim 1, wherein the suction connection furthermore comprises a second pipe socket (25), which is connected to the first flange (10) and projects in the axial direction in the direction away from the second flange (12), and through which the first flange (10) is arranged to be connected to the outlet flange of the suction pipe.

6. The suction connection according to claim 5, wherein the first pipe socket (15) is telescopically displacable in said second pipe socket (25).

7. The suction connection according to claim 1, wherein the suction connection furthermore comprises a second pipe socket (25), which is connected to the first flange (10) and projects in the axial direction in the direction towards the second flange (12).

8. The suction connection according to claim 7, wherein the first pipe socket (15) is telescopically displacable in said second pipe socket (25) and comprises a sealing flange (20) displacable along the first pipe socket, which sealing flange is disengageably connectable to the first flange (10) through the second pipe socket (25).

9. The suction connection according to claim 7, wherein the first pipe socket (15) is telescopically displacable outwardly of said second pipe socket (25) and comprises a sealing flange (20) displacable along the second pipe socket, which sealing flange is disengageably connectable to the upstream located end of the first pipe socket (15).

10. The suction connection according to claim 1, wherein the first flange (10) and the second flange (12) are fixedly connected to each other by at least one stiffening bar (14).

* * * * *